United States Patent
Bean et al.

(10) Patent No.: US 7,912,643 A0
(45) Date of Patent: Mar. 22, 2011

(54) METHOD AND APPARATUS FOR LOCATING A SATELLITE SPOOFER

(75) Inventors: Reginald D. Bean, Center Point, IA (US); Kurt L. Nelson, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 86 days.

(21) Appl. No.: 10/427,369

(22) Filed: May 1, 2003

(51) Int. Cl.
| | |
|---|---|
| G01C 21/00 | (2006.01) |
| G01S 19/46 | (2010.01) |
| H04B 7/00 | (2006.01) |
| H04W 4/00 | (2009.01) |
| H04J 3/00 | (2006.01) |

(52) U.S. Cl. ... 701/214; 701/200; 701/213; 342/357.29; 342/357.62; 455/69; 455/440; 455/456.3; 370/336

(58) Field of Classification Search ............ 701/213, 701/215, 214, 200; 73/178 R; 340/988, 340/989, 991, 992, 993; 342/457, 357.29, 342/357.62; 455/456, 69, 440, 456.3
See application file for complete search history.

(56) References Cited

U.S. PATENT DOCUMENTS

| | | | | |
|---|---|---|---|---|
| 4,042,927 A | * | 8/1977 | Helms ............................ | 342/13 |
| 5,311,194 A | * | 5/1994 | Brown .................... | 342/357.06 |
| 5,440,491 A | * | 8/1995 | Kawano et al. .............. | 701/200 |
| 5,557,284 A | * | 9/1996 | Hartman .................. | 342/357.03 |
| 5,857,155 A | * | 1/1999 | Hill et al. .................... | 455/456.3 |
| 5,896,105 A | * | 4/1999 | Murphy et al. ............... | 342/368 |
| 5,936,571 A | * | 8/1999 | Desjardins ............... | 342/357.08 |
| 5,970,481 A | * | 10/1999 | Westerlage et al. ........... | 705/417 |
| 6,101,178 A | * | 8/2000 | Beal .............................. | 370/336 |
| 6,483,457 B2 | * | 11/2002 | Hirata et al. ............. | 342/357.12 |
| 6,882,310 B1 | * | 4/2005 | Drentea .................. | 342/357.12 |
| 2002/0044614 A1 | * | 4/2002 | Molnar et al. ................ | 375/346 |
| 2002/0118133 A1 | * | 8/2002 | Desjardins ............... | 342/357.12 |
| 2003/0114983 A1 | * | 6/2003 | Irvin et al. .................... | 701/214 |
| 2004/0176909 A1 | * | 9/2004 | Desjardins ..................... | 701/213 |
| 2004/0198392 A1 | * | 10/2004 | Harvey et al. .............. | 455/456.1 |
| 2004/0257275 A1 | * | 12/2004 | Yee et al. ................. | 342/357.02 |

OTHER PUBLICATIONS

Wen et al, Countermeasures for GPS signal spoofing.*

* cited by examiner

Primary Examiner — Khoi Tran
Assistant Examiner — Ian Jen
(74) Attorney, Agent, or Firm — Matthew J. Evans; Daniel M. Barbieri (57) ABSTRACT

A spoofer location system includes a number of receivers that receive positioning signals. A data engine receives information from the receivers and determines a location of a spoofer source signal. The location of the spoofer source signal is determined by determining a range from each of the number of receivers to the source. The system can be employed in a global positioning system. The spoofer location system can be utilized with guided munitions and other vehicles.

20 Claims, 8 Drawing Sheets

METHOD AND APPARATUS FOR LOCATING A SATELLITE SPOOFER

FIELD OF THE INVENTION

The present invention relates to positioning systems. More particularly, the present invention relates to a system and method of locating a satellite spoofer.

BACKGROUND OF THE INVENTION

Global navigational satellite systems (GNSS) include the global positioning system (GPS), the Galileo positioning system, and the global orbiting navigational satellite system (GLONASS). GNSS-based navigational systems are often utilized by military and civilian naval, ground, and airborne vehicles or platforms for navigation, targeting, and positioning applications.

In a GPS navigational system, GPS receiver units typically receive satellite or coded GPS signals from a set of twenty-four (24) Navstar satellites deployed in 12-hour orbits about the earth and dispersed in six orbital planes at an altitude of 10,900 nautical miles in half geosynchronous orbits. A GPS constellation can include more or less than 24 satellites. The position of the GPS satellites is controlled and monitored by the Department of Defense (DoD). GPS satellites continuously emit coded GPS signals.

The GPS signal contains timing information that allows a user to determine the time elapsed for the GPS signal to traverse the distance between the GPS satellite and the user (the platform). By knowing the time the GPS signal left the GPS satellite, the time the GPS signal arrived at the user, and the speed of the GPS signal, the user can determine the distance from itself to the GPS satellite. By knowing the position of the GPS satellite (ephemeris data), and the distance from itself to a set of typically four GPS satellites, the user can successfully calculate its own position.

The GPS signal emitted by the satellites contains L-band carrier components at the transmitted frequencies of 1.575 GHz (L1) and 1.2276 GHz (L2). The L1 carrier component is phase shift keyed (PSK) modulated by two orthogonal pseudo-random (PRN) ranging codes, a precise P(Y) code at a chipping rate of 10.23 MHz and a course acquisition (C/A) PRN code at a chipping rate of 1.023 MHz. Navigation data at 50 bits per second is modulo-2 added to each ranging code. The PRN ranging codes provide timing information for determining when the GPS signal was broadcast. The data component provides information, such as, the satellite orbital position. The L2 carrier is similar to the L1 carrier except that it contains either one but not both simultaneously PSK modulates P(Y) and C/A codes. A military GPS receiver can process both P(Y) and C/A signals. A civilian receiver can only process C/A and P signals.

Position determination using a conventional GPS receiver is well known in the art. In conventional GPS, a receiver makes ranging measurements between an antenna coupled to the receiver and each of at least four GPS satellites in view. The receiver makes these measurements from the timing information and the satellite orbital position information obtained from the PRN code and data components of each GPS signal received. By receiving four different GPS signals, the receiver can make accurate position determinations.

The receiver acquires the satellite signals after down conversion by a direct injection local oscillator (LO). The LO is referenced and locked to a crystal oscillator. The downconverted signal is quantized and digitally processed to determine PRN code position and the data component, hence, to calculate position information.

Satellite spoofer systems, such as GPS satellite spoofers, can deny access or degrade the navigation or positioning performance of satellite positioning equipment, such as GPS user equipment. A spoofer is a device that replicates or mimics a satellite positioning signal, such as a GPS signal, and transmits this replicated signal (e.g., a false or spoofer signal) with the intent of denying access to the real, true positioning signal. Conventional GPS receivers are susceptible to interference with the acquisition and tracking of real satellite signals and to errors in the positioning solution or navigation solution due to spoofer signals. This can cause degradation to the receiver's ability to acquire satellites and can degrade the receiver's calculated position solution to the extent that the position solution becomes unusable. If this degradation is not detected, it could jeopardize the mission for which the receiver is being utilized. A spoofer can interfere with the normal operation of a GPS receiver to varying extents. To the casual user, this error may or may not be significant, but to the precise positioning user, this position error may jeopardize the mission.

Thus, there is a need for a system that can quickly locate a source of a replicated signal or spoofer signal. There is also a need for a system that can differentiate between true signals and replicated spoofer signals. Further, there is a need for a positioning receiver that will receive a replicated spoofer GPS signal and that may also receive a true GPS signal. Further still, there is a need for a GPS receiver that can acquire and track a spoofer signal or a multitude of spoofer signals having the same or different identifications. Further, there is a need for a system which can collect the spoofer signal information from multiple sources. Further, there is a need for a system which can provide anti-spoofing information in the form of spoofer locations. Yet further, there is a need for a system which can determine an exact location of a GPS satellite spoofer to assist in the targeting, removal, and tracking of spoofing devices.

SUMMARY OF THE INVENTION

An exemplary embodiment relates to a spoofer location system. The spoofer location system includes a number of receivers and a data engine. The receiver receives positioning signals and at least one spoofer signal. The data engine receives information from the receiver. A location of a source of the spoofer signal is determined by determining a range from each of the receivers to the source.

An exemplary embodiment relates to a spoofer locator including an interface and a control circuit. The control circuit is coupled to the interface and receives information from the interface. The control circuit determines a location of the spoofer. The information is indicative of a distance of the spoofer from a plurality of satellite positioning signal receivers.

Still another exemplary embodiment relates to a method of determining a location of a spoofer in a positioning system. The positioning signal provides positioning signals to an environment. The spoofer provides a spoofer signal. The spoofer signal simulates a positioning signal. The method includes receiving the spoofer signal at a plurality of different locations, obtaining an indication of the actual position of the different locations, determining ranges from the spoofer to the plurality of different positions from the spoofer signal, and determining the location of the spoofer in response to the ranges.

Yet another exemplary embodiment relates to a spoofer locator for use in a satellite positioning system providing satellite positioning signals to an environment. The environment includes at least one spoofer providing a spoofer signal. The spoofer signal simulates a satellite positioning signal. The spoofer locator includes means for receiving the spoofer signal at a plurality of different locations, means for obtaining an indication of the actual position of the different locations, means for determining ranges from the spoofer to the plurality of different positions from the spoofer signal, and means for determining the location of the spoofer in response to the ranges.

BRIEF DESCRIPTION OF THE DRAWINGS

Exemplary embodiments of the present invention will be described with reference to the accompanying drawings, wherein like numerals denote like elements.

DETAILED DESCRIPTION OF THE PREFERRED EMBODIMENTS

Figure 1:
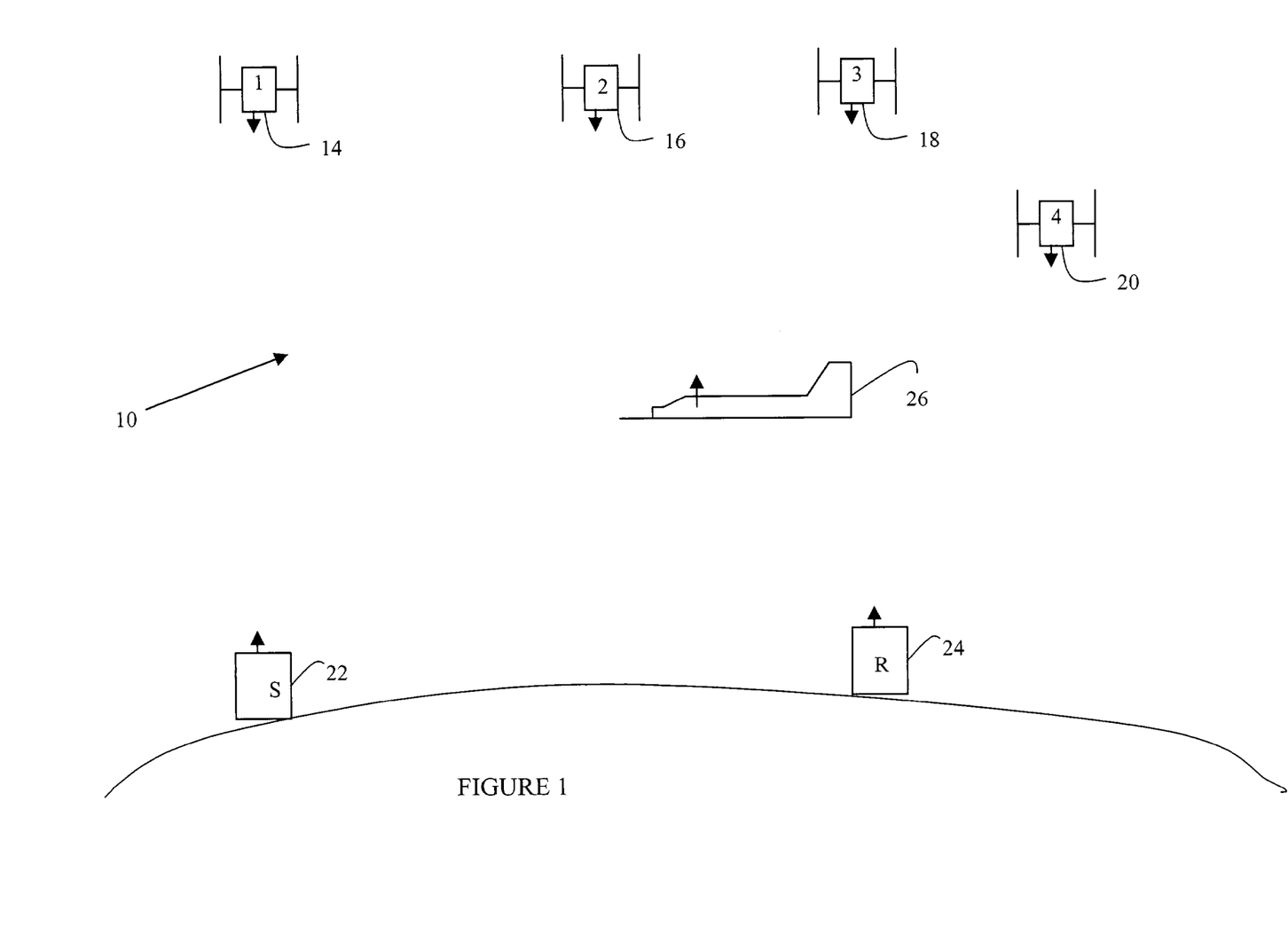
FIG. 1 is a general block diagram of an environment including a positioning system and a spoofer.

With reference to FIG. 1, a positioning system 10 is disposed in an environment including a positioning receiver 24, a spoofer 22, and satellites 14, 16, 18, and 20. An airplane 26 or other vehicle can also include a positioning receiver. Positioning system 10 is preferably a satellite positioning system, such as, a GLONASS, Galileo or GPS positioning system that can be utilized in a number of applications. Alternatively, system 10 can be utilized with psuedo-lite system or any positioning system which utilizes electromagnetic signals. Although the invention is described below with reference to a GPS system, the principles of the present invention can be utilized in any type of positioning system including a GLONASS system or other positioning system.

Receiver 24 can be mounted on any type of airborne, naval, or ground-based vehicle or other platform. More particularly, receiver 24 can be carried by personnel, be fixed in position or be attached to gun-fired munitions or tactical-guided missiles for providing positioning information. Receiver 24 is usable in any applications or environments where positioning and locating operations are necessary.

Positioning receiver 24 receives satellite signals from satellites 14, 16, 18, and 20 on an antenna and generates position data representative of the position of receiver in response to the satellite signals. When system 10 is embodied as a GPS system, the satellite signals generally have a frequency in the L1 band, e.g., 1.575 Gigahertz (GHz) or L2 band 1.2276 (GHz) and are provided from satellites 14, 16, 18, and 20. A signal-search algorithm preferably performs a Doppler search, which is divided into several windows, with each window representing approximately +/−0.24 parts per million (ppm) of reference oscillator frequency. The algorithm scans all code positions in each Doppler window until the satellite signals are acquired by positioning receiver 24.

Receiver 24 can include a scorpion GPS device manufactured by Conexant Systems, Inc. in combination with a Mono-Pac RF front end and analog/digital converter device, such as, the Gemini/Pisces device manufactured by Conexant Systems, Inc. Alternatively, other types of positioning receivers 24 manufactured by a variety of GPS receiver suppliers can be utilized.

A spoofer 22 is provided in the environment of system 10 and provides a replicated signal of a satellite signal associated with at least one of satellites 14, 16, 18, and 20 or any valid GPS or positioning signal. The environment can contain one or more spoofers 22. Spoofer 22 provides a spoofer signal that replicates a satellite signal from a satellite location. The spoofer signal is received by receiver 24. Due to the location of spoofer 22 being different from the expected satellite position, the spoofer signal from spoofer 22 causes receiver 24 to incorrectly determine location and position. Also, the spoofer signal can interfere with acquisition and tracking of satellite signals from satellites 14, 16, 18, and 20.

Figure 2:
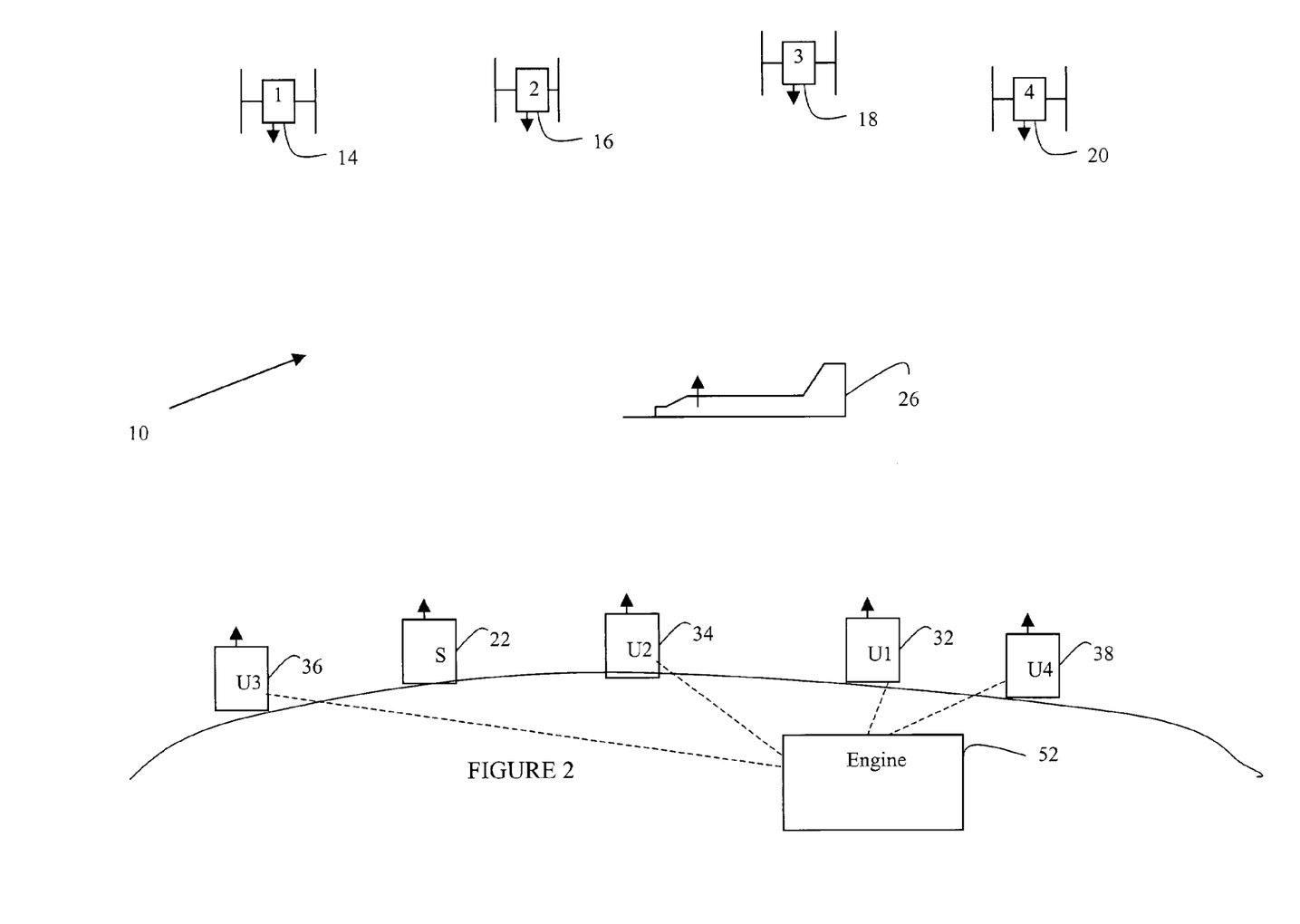
FIG. 2 is a general block diagram of the environment illustrated in FIG. 1 including a spoofer location system in accordance with an exemplary embodiment.

With reference to FIG. 2, positioning system 10 is utilized with an anti-spoofing system or spoofer location system. The spoofer location system is comprised of a number of receivers. In one embodiment, the spoofer locator is comprised of a receiver 32, a receiver 34, a receiver 36, a receiver 38, and an engine 52. Receivers 32, 34, 36 and 38 are in communication with engine 52 and can be similar to receiver 24 (FIG. 1). Dashed lines in FIG. 2 represent a wired or wireless connection.

As discussed with reference to FIG. 1, receivers 32, 34, 36 and 38 can be provided as part of various military and non-military equipment, including airplane 26, vehicles, surveying equipment, hand-held equipment, etc. Engine 52 can be provided as part of one of receivers 32, 34, 36 and 38 or can be a separate unit in a mobile or a fixed position. Receivers 32, 34, 36 and 38 preferably provide an indication of the signal from spoofer 22 to engine 58 so that a range from each of receivers 32, 34, 36 and 38 to spoofer 22 can be determined. The indication can be a replica of the signal, a copy of the signal, information about the signal, or information about the range of spoofer 22 to the respective receiver of receivers 32, 34, 36, and 38.

Engine 52 utilizes the range associated with each of receivers 32, 34, 36 and 38 to spoofer 22 to determine the exact location of spoofer 22. Receivers 32, 34, 36 and 38 can be configured to identify the spoofer signal and determine the range of the receiver to spoofer 22 in response to the spoofer signal or can forward the spoofer signal or information about the spoofer signal. Preferably, the information includes the identity of the spoofer signal and data for determining the range to receivers 32, 34, 36 and 38. Engine 52 utilizes the range from each of receivers 32, 34, 36, and 38 to spoofer 22 to determine the location of spoofer 22.

Figure 3:
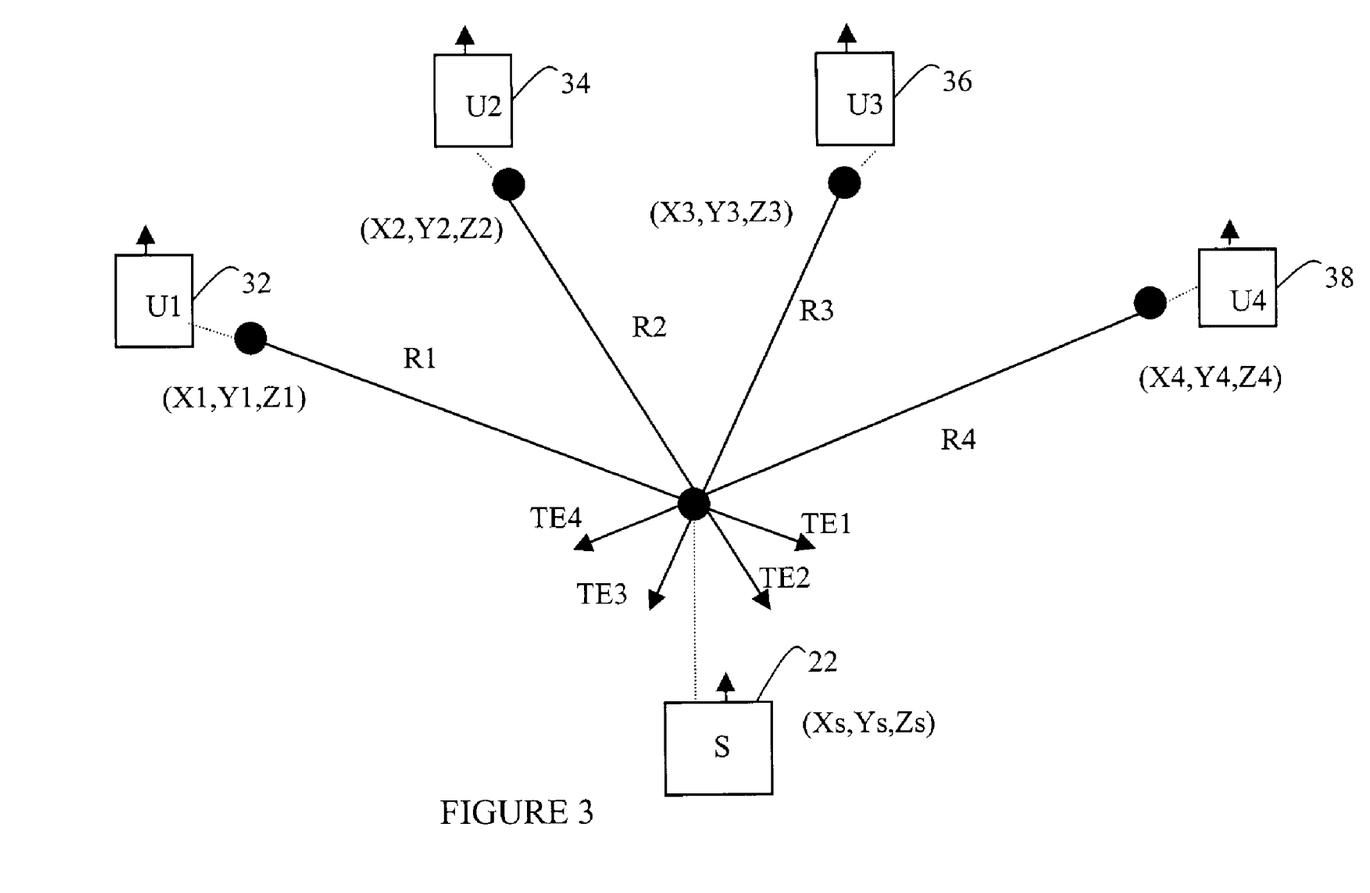
FIG. 3 is a block diagram of the spoofer locator system illustrated in FIG. 2 graphically showing a spoofer location calculation in accordance with another exemplary embodiment.

With reference to FIG. 3, receivers 32, 34, 36 and 38 are located at coordinates $(X_1, Y_1, Z_1)$, $(X_2, Y_2, Z_2)$, $(X_3, Y_3, Z_3)$ and ($X_4$, $Y_4$ and $Z_4$), respectively. Coordinates $X_{1-4}$, $Y_{1-4}$, and $Z_{1-4}$ are known or can be determined by receivers 32, 34, 36, and 38. Spoofer 22 is located at coordinates $X_S$, $Y_S$, $Z_S$. Coordinates $X_S$, $Y_S$, and $Z_S$ are unknown until engine determines coordinates $X_S$, $Y_S$, $Z_S$.

Receivers 32, 34, 36 and 38 can determine their position ($X_{1-4}$, $Y_{1-4}$, and $Z_{1-4}$) by communicating with satellites 14, 16 and 18. Alternatively, if receivers 32, 34, 36, and 38 are in a fixed position, the coordinates ($X_{1-4}$, $Y_{1-4}$, and $Z_{1-4}$) can be stored in memory associated with engine 52 or receivers 32, 34, 36 and 38. In another alternative, devices or control centers can track coordinates ($X_{1-4}$, $Y_{1-4}$, and $Z_{1-4}$) and supply them to engine 52.

Receivers 32, 34, 36, and 38 can determine a pseudo-range value representative of the distance between the receiver and spoofer 22. The pseudo-range between receiver 32 and spoofer 22 is determined in response to the determining coordinates $X_S$, $Y_S$, and $Z_S$ spoofer signal received by receiver 32. The pseudo-range associated with receiver 32 is equal to R1+TE1, where R1 is the actual range and TE1 is the spoofer time error range. Similarly, receiver 34 determines the pseudo-range between it and spoofer 22 in response to the spoofer signal received by receiver 34. The pseudo-range associated with receiver 34 is comprised of actual range R2 and spoofer time error TE2 (R2+TE2). Similarly, receiver 36 determines the pseudo-range comprised of actual range R3 and spoofer time error TE3 in response to the spoofer signal received at receiver 36 (R3+TE3). Also, receiver 38 determines the pseudo-range comprised of actual range R4 and spoofer time error range TE4 in response to the spoofer signal received at receiver 38 (R4+TE4).

The coordinates $X_S$, $Y_S$, $Z_S$ are calculated according to the following equations. Equations 1–4:

$$\text{pseudo-range1}(PR1) = R1 + TE1 \quad (1)$$

$$\text{pseudo-range2}(PR2) = R1 + TE2 \quad (2)$$

$$\text{pseudo-range3}(PR3) = R3 + TE3 \quad (3)$$

$$\text{pseudo-range4}(PR4) = R4 + TE4 \quad (4)$$

Receivers 32, 34, 36 and 38 measure the pseudo-range at the same time such that the spoofer time error (TE) is equal for all equations. Accordingly, $TE_1 = TE_2 = TE_3 = TE_4 = TE$. Accordingly, four equations (Equations 5–8) can be utilized to determine $X_S$, $Y_S$ and $Z_S$ as follows:

$$[(X_1 - X_S)]^2 + [(Y_1 - Y_S)]^2 + [(Z_1 - Z_S)]^2 = [(PR1 - TE)]^2 \quad (5)$$

$$[(X_2 - X_S)]^2 + [(Y_2 - Y_S)]^2 + [(Z_2 - Z_S)]^2 = [(PR2 - TE)]^2 \quad (6)$$

$$[(X_3 - X_S)]^2 + [(Y_3 - Y_s)]^2 + [(Z_3 - Z_S)]^2 = [(PR_3 - TE)]^2 \quad (7)$$

$$[(X_4 - X_S)]^2 + [(Y_4 - Y_s)]^2 + [(Z_4 - Z_S)]^2 = [(PR_4 - TE)]^2 \quad (8)$$

Using algebra to solve for $S_X$, $S_Y$, $S_Z$ and TE, the spoofer true position can be determined because $X_{1-4}$, $Y_{1-4}$ and $Z_{1-4}$ and PR1, PR2, PR3 and PR4 are known values.

Figure 4:
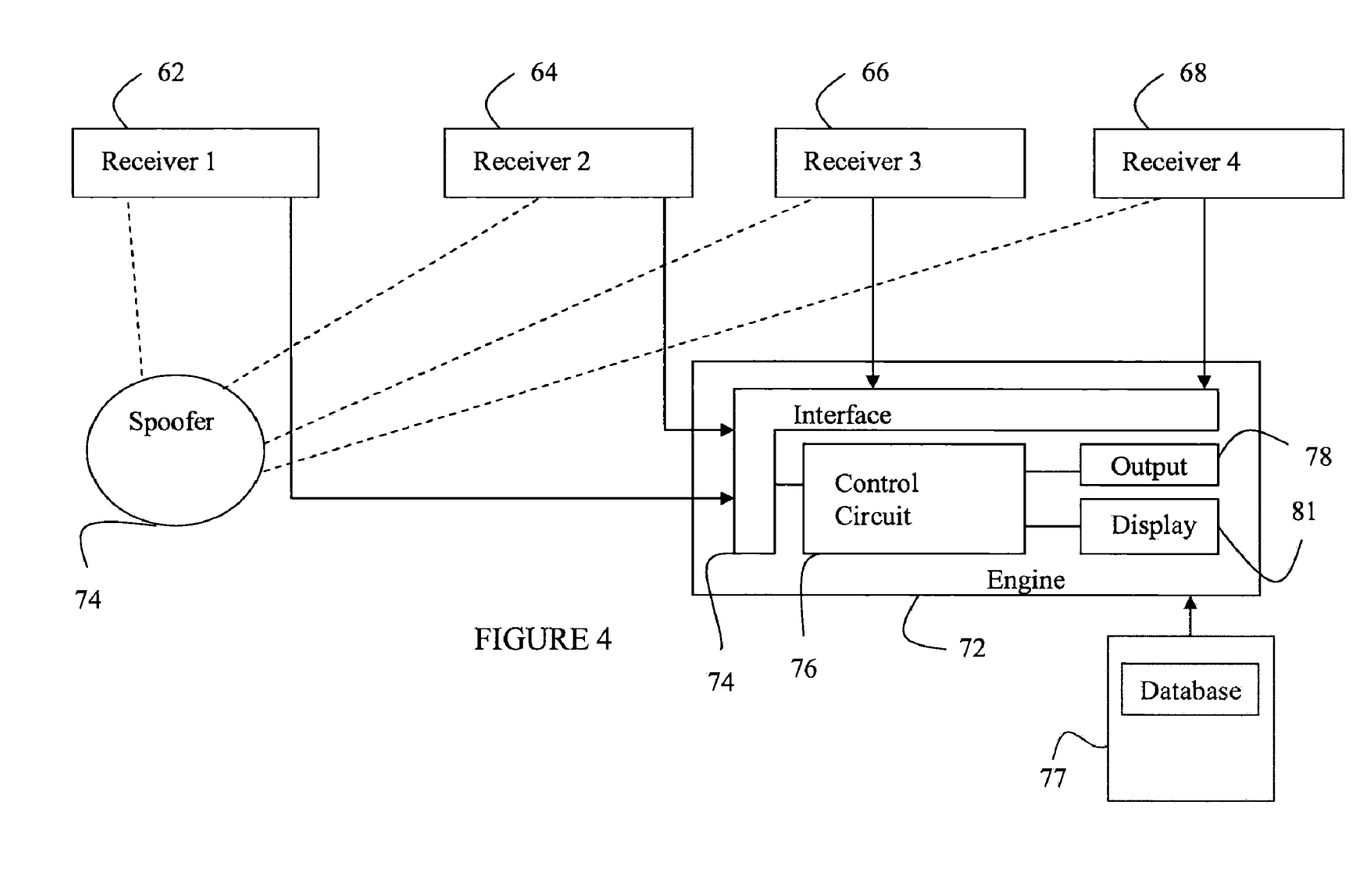
FIG. 4 is a more detailed block diagram of the spoofer location system illustrated in FIG. 2 in accordance with an exemplary embodiment.

With reference to FIG. 4, a data engine 72 includes an interface 74 for receiving the pseudo-range information (PR1–4) from receivers 62, 64, 66 and 68. As discussed with reference to FIG. 3, receiver 62, 64, 66 and 68 receive the spoofer signal from spoofer 74 and identify the spoofer signal. Once the spoofer signal is identified, receivers 62, 64, 66 and 68 provide the respective pseudo-range to interface 74 as well as the position of each of receivers 62, 64, 66 and 68. In one embodiment, the spoofer signal can be identified by signal characteristics, such as signatures, amplitudes, etc.

In another embodiment, the spoofer signal can be identified by determining its location according to equations 5–8. A location close to the surface of the earth indicates a high likelihood of a spoofer. In still another embodiment, the determined location can be compared to a database 77 of known "true" location of GPS signal or positioning signal sources. If the location does not match one of the known locations, the signal source is a spoofer.

In one embodiment, receivers 32, 36, and 38 provide all received signals or the necessary information about them to engine 72. Engine 72 processes the signals or information about them and identifies the spoofer signals by identifying the signals having a coordinate that is close to the Earth's surface relative to a satellite's coordinate or by comparing the coordinate to a database 77 of known locations of true GPS signal sources.

The pseudo-range information is provided to a control circuit 76 which processes the position information associated with receiver 62, 64, 66 and 68, as well as the pseudo-range signals associated with receiver 62, 64, 66 and 68 and determines the spoofer location.

Spoofer location ($X_S$, $Y_S$, $Z_S$) can be provided at an output 78 for use in equipment used to target spoofer 74 and can be provided on a display 81 so that the location of the source of the spoofer signal can be viewed by a human operator. Engine 72 can be configured as any number of electronic circuits including a microprocessor controlled circuit with an RF interface for communicating with receivers 62, 64, 66 and 68. Alternatively, the information from receivers 62, 64, 66 and 68 can be provided as digital data through wired or wireless modem connections. Control circuit 76 can be configured as a microprocessor operating software to receive the appropriate information from interface 72 and make the appropriate spoofer location and calculation as discussed with reference to FIG. 3.

Control circuit 76 can also be configured as an application specific integrated circuit (ASIC), or other electronic circuitry. Display 81 can be an LED or LCD display. In one embodiment, engine 72 is a workstation associated with a battle field operations unit. In another embodiment, engine 72 can be provided on ordnance, or other targeting systems and output 78 can be connected to the guidance system associated with the ordnance.

Figure 5:
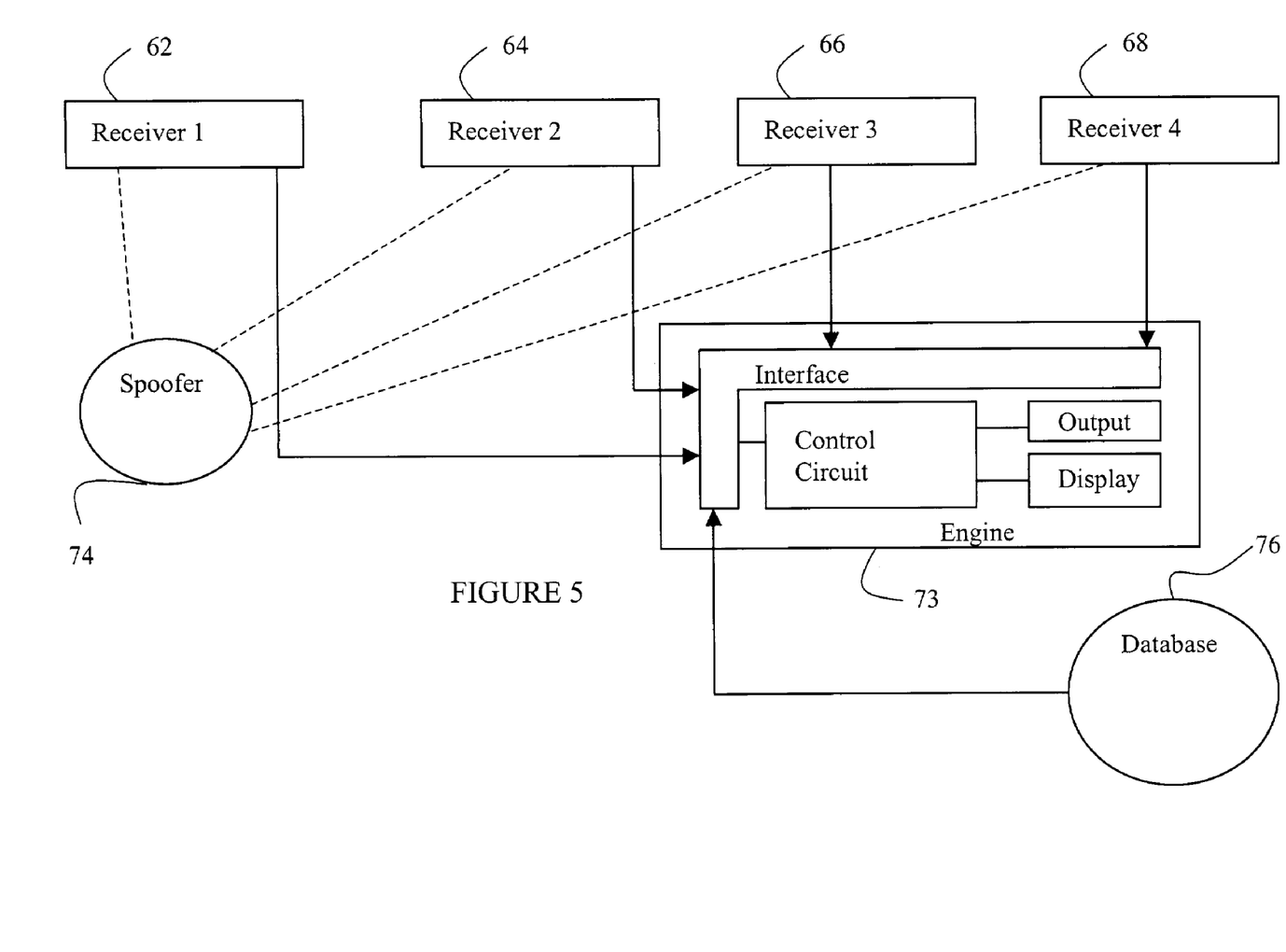
FIG. 5 is a more detailed block diagram of another embodiment of the spoofer location system illustrated in FIG. 2 in accordance with another exemplary embodiment.

With reference to FIG. 5, receivers 62, 64, 66 and 68 do not need to provide position information associated with receivers 62, 64, 66 and 68 as engine 72 can receive such information from database 76. Receivers 62, 64, 66, and 68 can be any military or civilian GPS receiver, such as those manufactured by Rockwell Collins, Inc., and modified to provide the information and operations discussed with reference to FIGS. 7 and 8 below. In this embodiment, receivers 62, 64, 66 and 68 are preferably fixed position receivers or provide communication to systems which track the positions of receivers 62, 64, 66 and 68 in database 76. In such an embodiment, receivers 62, 64, 66 and 68 may, instead of providing pseudo-range information, provide the actual spoofer signal to engine 72 or a replication thereof. Engine 72 can process the actual spoofer signal and determine the pseudo-range information from the actual or replicated spoofer signal.

Figure 6:
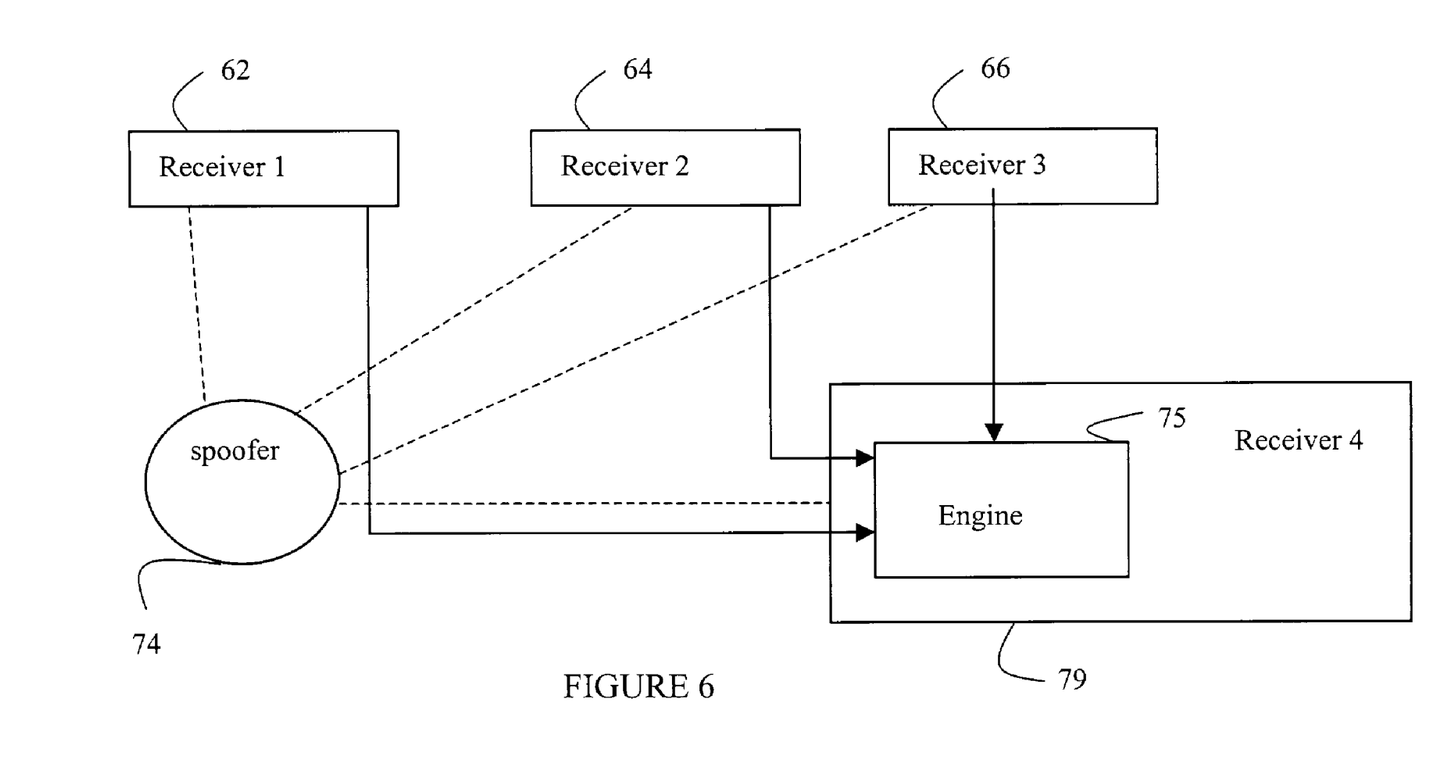
FIG. 6 is yet another embodiment of the spoofer locator system illustrated in FIG. 2 in accordance with still another exemplary embodiment.

With reference to FIG. 6, an engine 75 is similar to engines 72 and 52 discussed with reference to FIGS. 2, 4 and 5 and is integrated within a receiver 79. Engine 75 can operate similarly to engine 72 or engine 73. Engine 75 can be integrated within any military or civilian GPS receiver, such as those manufactured by Rockwell Collins, Inc.

Figure 7:
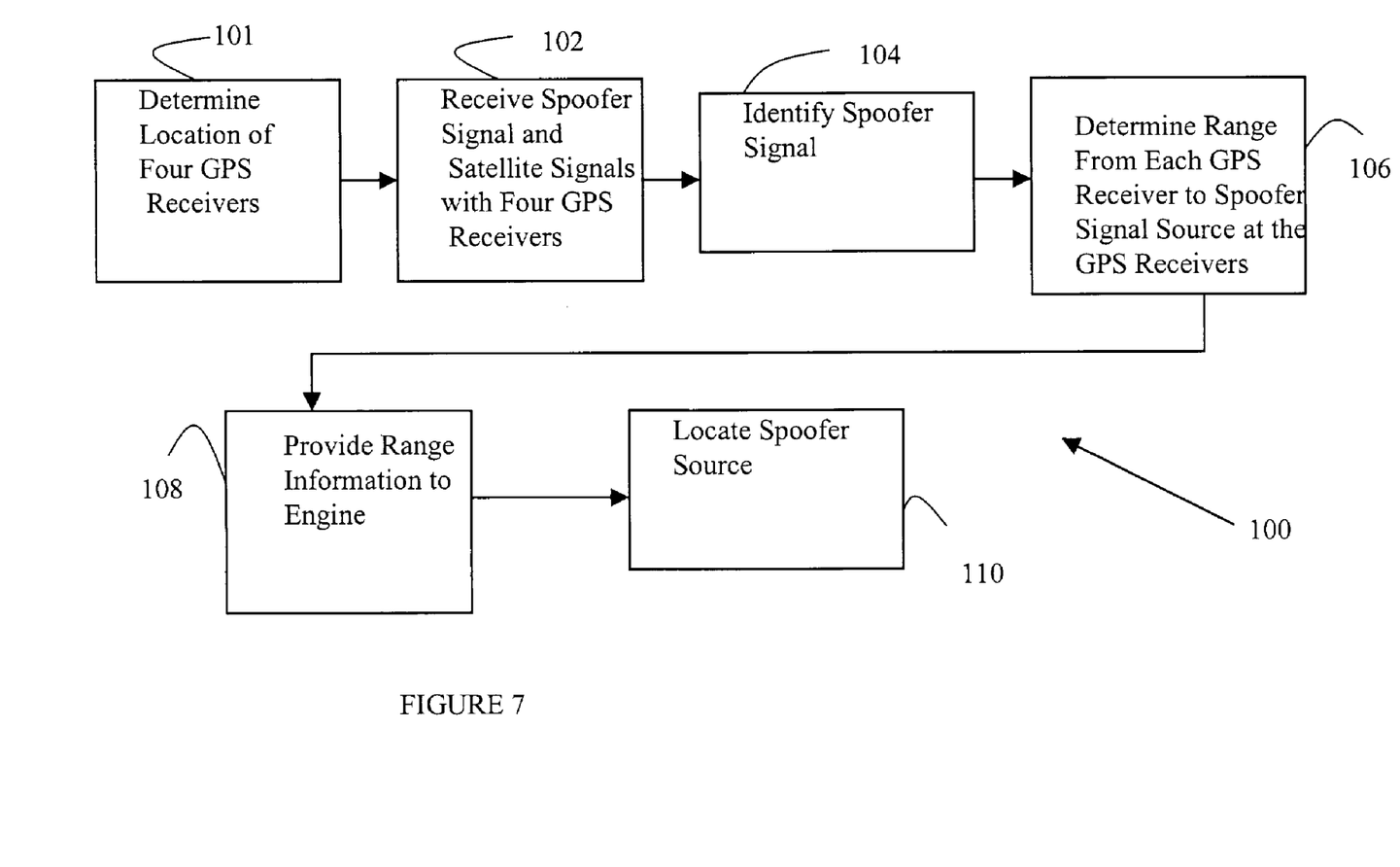
FIG. 7 is a flow diagram showing an operation scheme for a spoofer location system illustrated in FIG. 2 in accordance with an exemplary embodiment.

With reference to FIG. 7, the operation of the spoofer locator illustrated in FIG. 2 is described below. In a step 101, the location of receivers 32, 34, 36, and 38 is determined. The location can be determined by receivers 32, 34, 36, and 38 using GPS principles or by tracking the location of receivers 32, 34, 36 and 38 by other methods. A database can be used to track the locations of receivers 32, 34, 36 and 38. In a step 102, the spoofer signal is received at receivers 32, 34, 36 and 38. In addition, receivers 32, 34, 36 and 38 receive satellite signals.

At a step 104, the spoofer signal is identified. Receivers 32, 34, 36 and 38 can calculate their position based upon the satellite signals and identify the spoofer signal. The spoofer signal can generally be identified because its location would generally be nearer the surface of the earth as with respect to satellites 14, 16 and 18. The calculation of the spoofer location is in a location that is close to earth rather than above earth as associated from satellites 14, 16 and 18.

In one embodiment, the calculated location is checked against a database of known GPS source locations. The database could contain information on known approximate ranges to known satellites. The ranges are calculated from ephemeris data for a given satellite. The database could also have other satellite specific data. In the case of a pseudo-lite there may also be ephemeris data. The database preferably includes data identifying the satellite and its location.

At a step 106, the range from each receiver 32, 34, 36 to spoofer signal source or spoofer 22, is determined. At a step 108, the range information is provided to a data engine such as engine 52 and at a step 110, the spoofer source is located.

Figure 8:
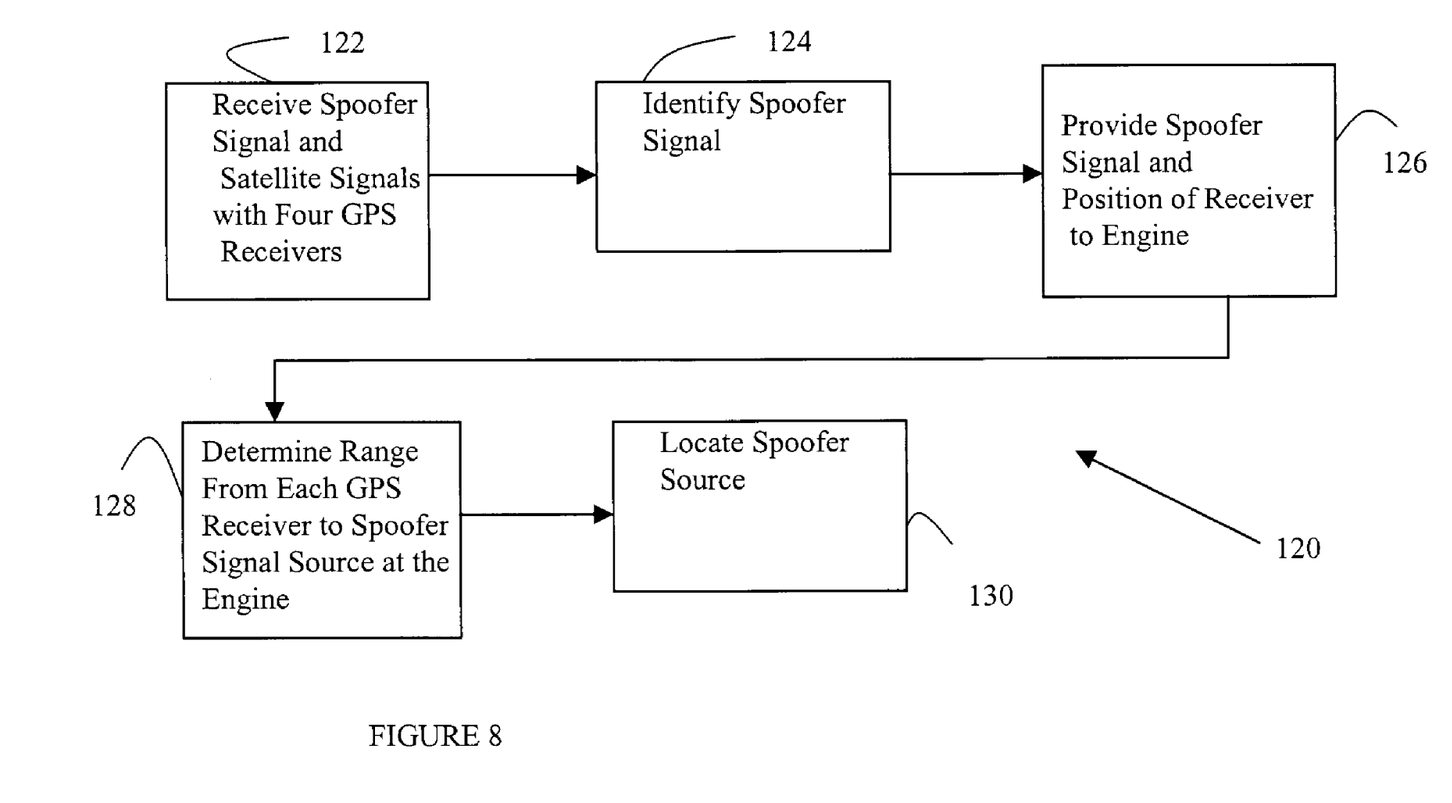
FIG. 8 is a flow diagram showing another operation scheme for the spoofer location system illustrated in FIG. 2 in accordance with another exemplary embodiment.

With reference to FIG. 8, a process 120 similar to process 100 receives spoofer signals and satellite signals at a step 122 with receivers 32, 34, 36 and 38. The spoofer signal is identified by receivers 32, 34, 36 and 38 at a step 124. The spoofer signal and position of a receiver are provided to engine 52. The range from each GPS receiver to the spoofer signal source is determined at the engine at a step 128. At a step 130, the location and the spoofer source is determined.

Process 120 is preferably utilized with a system such as that described with reference to FIG. 5. Process 100 is preferably utilized with a spoofer locator such as that described with reference to FIG. 4 or 6.

A spoofer signal can be identified after a number of satellite signals are processed by engine 52. In this embodiment, steps 104 and 124 are performed by engine 52 at steps 110 and 130. The spoofer signal can be easily identified because its position will be near the surface of the earth. If the position of the source of satellite signal is calculated, the position can be easily identified because it is high in the atmosphere.

A data engine can be a computer or central processing unit. The location of the spoofer signal can be utilized to perform in assisting the steering applications associated with the GPS signal. Further, the anti-spoofing information in the form of spoofer locations can be provided to other receivers such as receivers 62, 64, 66 and 68 operating in the area.

It is understood that, while preferred embodiments, examples, and values are given, they are for the purpose of illustration only. The apparatus and method of the invention are not limited to the precise details and conditions disclosed. For example, although a specific range location algorithm is described, other algorithms and logic could be utilized to determine spoofer locations. Further, although conventional GPS receivers are discussed, the present invention can be utilized in other types of receivers. Thus, changes may be made to the details disclosed without departing from the spirit of the invention, which is defined by the following claims.

What is claimed is:

1. A spoofer location system, comprising:
   at least three receivers, the receivers receiving positioning signals and at least one spoofer signal;
   a data engine receiving information from the receivers, wherein a location of a source of the spoofer signal is determined by determining a range from each of the receivers to the source, wherein the range is determined without the source of the spoofer signal receiving a signal from the receivers; and
   a database memory storing location information of true signal sources transmitting the positioning signals, wherein the data engine compares the location of the source of the spoofer signal to the location information of the true signal sources stored in the database memory to verify that the spoofer signal is not from one of the true signal sources.

2. The spoofer location system of claim 1, wherein the system includes four satellite positioning receivers.

3. The spoofer location system of claim 2, wherein the information is a signal representative of the pseudo-range from each receiver.

4. The spoofer location system of claim 3, wherein the pseudo-range comprises range and spoofer time error components.

5. The spoofer location system of claim 1, wherein the information includes a representation of the spoofer signal received by the receiver and a location of the receiver associated with the representation.

6. In a satellite positioning system providing satellite positioning signals to an environment, the environment including at least one spoofer providing a spoofer signal, the spoofer signal simulating a satellite positioning signal a spoofer locator comprising:
   an interface;
   a control circuit coupled to the interface, the control circuit receiving first information from the interface, the control circuit determining a location of the spoofer from the first information, the first information being indicative of a distance of the spoofer from a plurality of at least three receivers, wherein the control circuit does not utilize information derived from a transmission signal to the spoofer; and
   a database memory storing location information of true signal sources transmitting the positioning signals, wherein the control engine compares the location of the source of the spoofer signal to the location information stored in the database memory to verify that the spoofer signal is not from one of the true signal sources.

7. The spoofer locator of claim 6, wherein the interface receives the first information from at least four satellite positioning receivers.

8. The spoofer locator of claim 6, wherein the first information is a signal representative of the pseudo-range from each receiver and the location of each receiver.

9. The spoofer locator of claim 8, wherein the pseudo-range comprises range and spoofer time error components.

10. The spoofer locator of claim 6, wherein the first information is provided to the interface as digital data.

11. The spoofer locator of claim 6, wherein the first information is provided as a replication of the spoofer signal.

12. The spoofer locator of claim 11, wherein the receivers are satellite positioning receivers including GPS processors.

13. A method of determining a location of a spoofer in a positioning system providing positioning signals to an environment, the spoofer providing a spoofer signal, the spoofer signal simulating a positioning signal and being received at least three different locations, the method comprising:
- obtaining an indication of the actual position of the different locations;
- determining ranges from the spoofer to the plurality of at least three different locations without providing a GPS signal to the spoofer and processing a response to the GPS signal from the spoofer;
- determining a spoofer location of the spoofer in response to the ranges; and
- comparing the spoofer location of the spoofer to location information of true signal sources transmitting the positioning signals to verify that the spoofer signal is not from one of the true signal sources, wherein the location information is stored in memory.

14. The method of claim 13, wherein the spoofer signal is received by a satellite positioning receiver at each location.

15. The method of claim 14, wherein the spoofer signal is received by at least four different satellite positioning receivers.

16. The method of claim 15, wherein the satellite positioning receivers determine the ranges.

17. The method of claim 13, wherein an engine determines the ranges.

18. In a satellite positioning system providing satellite positioning signals to an environment, the environment including at least one spoofer providing a spoofer signal, the spoofer signal simulating a satellite positioning signal, a spoofer locator comprising:
- means for receiving the spoofer signal at a plurality of different locations;
- means for obtaining an indication of the actual position of the different locations;
- means for determining ranges from the spoofer to the plurality of different positions from the spoofer signal without providing a GPS signal to the spoofer;
- means for determining the location of the spoofer in response to the ranges; and
- means for comparing the determined location of the spoofer to information in a database storing location information of true signal sources that transmit the positioning signals to verify that the spoofer signal is not from one of the true signal sources, wherein the database is a memory.

19. The system of claim 1, wherein the engine and database memory are separate components from the at least three receivers.

20. The system of claim 1, wherein the location information is satellite position information.

* * * * *